United States Patent
Stall et al.

(10) Patent No.: US 10,403,033 B2
(45) Date of Patent: Sep. 3, 2019

(54) PRESERVING SCENE LIGHTING EFFECTS ACROSS VIEWING PERSPECTIVES

(71) Applicant: Microsoft Technology Licensing, LLC, Redmond, WA (US)

(72) Inventors: Jeffrey Evan Stall, Kirkland, WA (US); Christopher Nathaniel Raubacher, Redmond, WA (US); Geoffrey Tyler Trousdale, Redmond, WA (US); Minmin Gong, Kirkland, WA (US); Nick Alexander Eubanks, Seattle, WA (US); Simeon John Cran, Redmond, WA (US); Kelly Renner, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 14 days.

(21) Appl. No.: 15/208,036

(22) Filed: Jul. 12, 2016

(65) Prior Publication Data
US 2018/0018812 A1 Jan. 18, 2018

(51) Int. Cl.
*G06T 15/50* (2011.01)
*G06T 15/20* (2011.01)

(52) U.S. Cl.
CPC .............. *G06T 15/50* (2013.01); *G06T 15/20* (2013.01)

(58) Field of Classification Search
CPC .......... G06F 3/011; G06T 15/08; G06T 15/20
See application file for complete search history.

(56) References Cited

U.S. PATENT DOCUMENTS 5,613,048 A * 3/1997 Chen ..................... G06T 15/205
345/419
5,669,685 A 9/1997 Kotani et al.
(Continued)

OTHER PUBLICATIONS

Michael Abrash, "Chapter 68 Quake's lighting model", Michael Abrash's Graphics Programming Black Book, Special Edition, Jan. 1, 1997, pp. 1244-1256, Retrieved from http://www.drdobbs.com/parallel/graphics-programming-black-book/184404919 on Nov. 28, 2017.*

(Continued)

*Primary Examiner* — Weiming He
(74) *Attorney, Agent, or Firm* — Newport IP, LLC; Han Gim

(57) ABSTRACT

A scene may be rendered as objects that are lit by various light sources. A scene designer may arrange the scene to create particular lighting effects when viewed from an initial perspective, such as gloss, translucency, and iridescence, and may choose lighting effects to create a desired aesthetic tone and/or highlighting within the scene. However, rendering the scene from a different perspective may alter the lighting effects (e.g., losing or misplacing desired lighting effects, and/or creating new and undesirable lighting effects, such as glare). Instead, when the scene is rendered from the initial perspective, the lighting effects created therein may be stored with the scene representation of the scene. A second rendering of the scene from a different perspective may reapply the stored lighting effects to the lit objects, thereby maintaining the lighting effects and the intent of the designer in the presentation of the scene from a different perspective.

20 Claims, 11 Drawing Sheets

(56) References Cited

U.S. PATENT DOCUMENTS

| | | | |
|---|---|---|---|
| 6,359,630 | B1 | 3/2002 | Morse et al. |
| 6,614,431 | B1 | 9/2003 | Collodi |
| 6,654,013 | B1 | 11/2003 | Malzbender et al. |
| 6,664,962 | B1* | 12/2003 | Komsthoeft ............ G06T 15/04 345/421 |
| 7,733,349 | B1 | 6/2010 | Tannenbaum |
| 8,090,194 | B2 | 1/2012 | Golrdon et al. |
| 8,836,761 | B2 | 9/2014 | Wang et al. |
| 8,848,201 | B1 | 9/2014 | Bruce et al. |
| 8,902,309 | B2 | 12/2014 | Jeong |
| 9,323,977 | B2 | 4/2016 | Shim et al. |
| 2003/0169272 | A1* | 9/2003 | Nagano ............... G06T 15/04 345/582 |
| 2005/0140670 | A1 | 6/2005 | Wu et al. |
| 2008/0007567 | A1* | 1/2008 | Clatworthy ............ G06Q 30/02 345/619 |
| 2009/0027391 | A1* | 1/2009 | Burley ................. G06T 15/04 345/426 |
| 2009/0052767 | A1* | 2/2009 | Bhalerao ............... G06T 15/50 382/154 |
| 2011/0035404 | A1* | 2/2011 | Morgan ............... H05B 37/029 707/769 |
| 2012/0075303 | A1* | 3/2012 | Johnsson .............. G06T 15/06 345/421 |
| 2012/0178528 | A1* | 7/2012 | Brunell .............. H05B 37/0254 463/31 |
| 2012/0235988 | A1 | 9/2012 | Karafin et al. |
| 2017/0287197 | A1* | 10/2017 | Liou ..................... G06T 13/80 |

OTHER PUBLICATIONS

David Blythe, Advanced Graphics Programming Techniques Using OpenGL, Aug. 9, 1999, retrieved from https://pdfs.semanticscholar.org/fc76/bb3649978a1939d9bd9d9d3769f47ebfc6c1.pdf on Nov. 28, 2017.*

Rumelt, Richard P., "Note on 3D Graphics Technology", Published on: Jun. 17, 2011, Available at: http://goodbadstrategy.com/wp-content/downloads/3DGraphicsTechnology.pdf.

Jones, et al., "Head-mounted Photometric Stereo for Performance Capture", In Proceedings of 37th International Conference and Exhibition on Computer Graphics and Intractive Techniques, Jul. 25, 2010, 1 page.

Int. Search Report/Written Opinion cited in PCT Application No. PCT/US2017/040565 dated Oct. 13, 2017, 181 pgs.

"Real-Time Photo Realistic Simulation of Complex Heritage Edifices", Oct. 25, 2011, George Papagiannakis, Gregoire L. Hoste, Alessandro Foni and Nadia Magnenat-Thalmann, In Proceedings of the Seventh International Conference on Virtual Systems and Multimedia, Oct. 25, 2001, 10 Pages.

"Multiple Viewpoint Rendering", Jul. 19, 1998, Michael Halle, In Proceedings of the 25th Annual Conference on Computer Graphics and Interactive Techniques, 12 Pages.

"Rendering with Coherent Layers", Aug. 3, 1997, Jed Lengyel and John Snyder, In Proceedings of the 25th Annual Conference on Computer Graphics and Interactive Techniques, pp. 233-242.

"Fast, Realistic Lighting for Video Games", May 1, 2003, Andre Jones, Anton Krupkin, Mateu Shert and Sergey Zhuker, In Journal of IEEE Computer Graphics and Applications, vol. 23, Issue 3, pp. 54-64.

"Real-Time Rendering, Passage", Chapter 5 titled "Texturing" In Real-Time Rendering, 1999, Thomas Akenini Moller and Eric Haines, pp. 99-144. Reference not available.

* cited by examiner

PRESERVING SCENE LIGHTING EFFECTS ACROSS VIEWING PERSPECTIVES

BACKGROUND

Within the field of computing, many scenarios involve a rendering of a scene of objects from a viewing perspective. For example, a collection of object models may be generated and arranged in a desired manner, including the selection and positioning of light sources to illuminate the scene. A viewing perspective may be selected to represent the position, angle, and/or orientation of a camera or a human viewer within the scene. The scene may be rendered from the viewing perspective using a variety of techniques for the object modeling, light dispersal and shadowing, and surface mapping to depict color, shading, translucency, and/or surface texture.

In addition to presenting the rendering of the scene, a device may capture a representation of the scene for subsequent presentation at a later time. Such capturing typically involves a choice between two techniques. As a first option, a flat, two-dimensional image of the scene from the viewing perspective, may be captured, such as a two-dimensional bitmap. As a second option, the three-dimensional scene model may be captured, including the object models and the light sources, which may be used to re-render from a different viewing perspective. In this manner, the scene representation of a scene may be captured for subsequent presentation in similar or different circumstances.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A three-dimensional scene may be designed by a scene designer, who may arrange the objects and light sources within the scene to achieve a particular intent. When viewed from a particular viewing perspective, the three-dimensional scene may exhibit a variety of lighting effects caused by the relative positions of the objects, the light sources, and the selected viewing perspective. For example, light sources may create gloss, translucency, and/or iridescence when viewed from the selected viewing perspective. The scene designer may arrange the scene to utilize these lighting effects, e.g., to highlight particular objects or surfaces thereof; to obscure certain features of the scene; or to achieve various aesthetic properties of the scene, such as color, tone, and perception of depth or scale.

In some circumstances, it may be desirable to enable the scene to be presented from a different viewing perspective, in a manner that reflects the three-dimensionality of the image. Such techniques may be difficult to achieve using a flat, two-dimensional capture of the scene, such as in an image. However, if the scene is rendered anew using the same object models and lighting sources but from a different viewing perspective, the lighting effects that are exhibited at the first viewing perspective may change. For example, gloss, translucency, and/or iridescence may be diminished or lost when the scene is viewed from a different viewing perspective, or may change in location and/or intensity. Additionally, new lighting effects may be created at the second perspective that diminish the quality of the scene presentation; e.g., lighting sources may create new instances of glare that obscure portions of the scene, and surfaces that appeared translucent when viewed from the first viewing perspective may appear opaque from a different viewing perspective. Such changes to the lighting effects may fail to preserve and reflect the intent of the scene designer.

Some of these undesirable alterations may be preserved by constraining the viewing perspective of the scene—e.g., capturing a static two-dimensional representation of the scene when viewed from the viewing perspectives (such as a screen capture or snapshot), or re-rendering the scene while limiting the degree to which the viewing perspective may be altered. Such techniques may preserve the intent of the scene designer, but may diminish or eliminate the capability of viewing the scene from significantly different viewing perspectives Presented herein are techniques for capturing a representation of a scene in view of the previously presented observations. In accordance with these techniques, the viewing perspective may be partitioned into a lighting perspective, i.e., the perspective from which the lighting effects are rendered, and an object perspective, i.e., the perspective from which the three-dimensional objects are rendered. In order to fulfill a request to present the scene from a second perspective, the scene may be rendered from the new object perspective, but the lighting effects may be maintained according to the original lighting perspective.

In accordance with these techniques, when a scene is first rendered from an initial perspective, a lighting effect of a light source is crated upon a lit object, due in part to the initial perspective, which may be selected by the scene designer. The lighting effect may be captured and stored with a representation of the object model of the scene. The scene may then be presented from a second perspective by re-rendering the object model, while applying the stored lighting effect to the lit object. Because the lighting effect generated from the initial perspective is maintained, the second rendering maintains consistent lighting effects despite the shift in the viewing perspective of the object model. In this manner, the rendering may preserve the intent of the scene designer when arranging the lighting effects during the initial perspective, in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
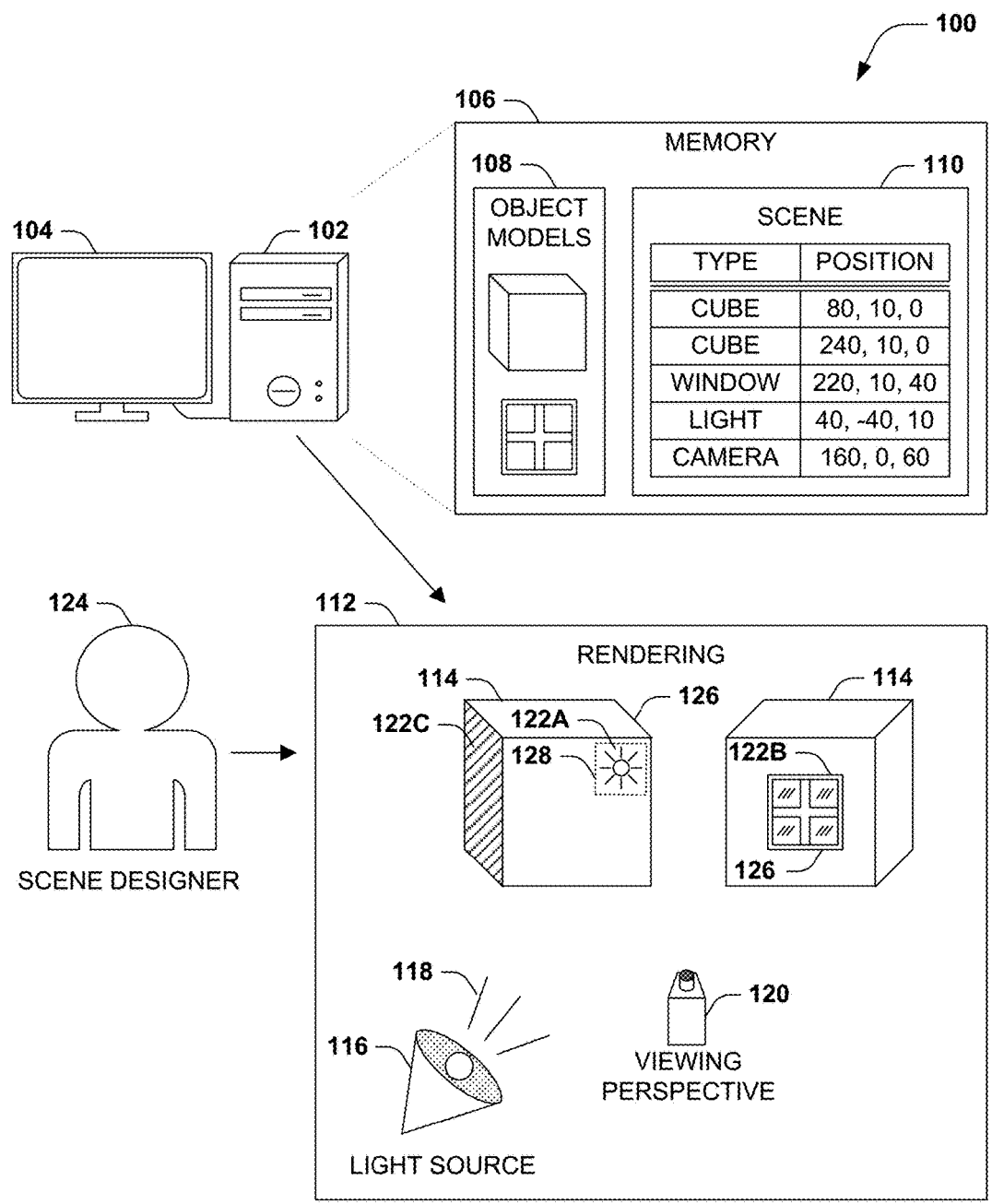
FIG. 1 is an illustration of an example scenario featuring a presentation of a rendering of a scene from a viewing perspective prepared by a scene designer.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 in which a device 102 presents a rendering 112 of a scene 110 comprising a collection of objects 114.

In this example scenario 100, the device 102 comprises a display 104 and a memory 106 storing a set of object models 108, such as three-dimensional geometric shapes and textures applicable thereto, and a definition of a scene 110 as a collection of objects 114, which are respectively specified by a position within the scene 110 and an object model 108 to be used for the rendering 112 of the scene 110. The device 102 may produce a rendering 112 of the scene 110, for presentation on the display 104, in response to a selection of a viewing perspective 120, such as a simulated viewpoint of a camera, or the viewing perspective of an observer such as a user of the device 102. The rendering 112 may involve rendering one or more light sources 116, which cast light 118 upon various objects 114 of the scene 110. Many techniques may be utilized in the course of generating the rendering 112 of the scene 110, including shape rendering and texturing techniques for the respective objects 114, and lighting techniques for applying the lighting 118 to the surfaces of the objects 114.

In such scenarios, a scene designer 124 may arrange the scene 110 in order to achieve a desired presentation of the content. In particular, the scene designer 124 may choose the viewing perspective 120 and the position of the lighting source 116 to create a particular aesthetic style or content when the scene 110 is rendered from the viewing perspective 120. For example, the scene designer 124 may position lighting within the scene to create desired lighting effects 122 when viewed from the selected viewing perspective 120. As a first such example, the light 118 from the light source 116 may create a first lighting effect 122A upon a lit object 126 that comprises a gloss representing a reflection of the light source 116 upon the surface of the lit object 126. As a second such example, a second lighting effect 122B may comprise a transparency of a lit object 126 such as a window. When the window is viewed from various viewing perspectives and/or positions of the light source 116, the window may appear completely opaque and/or reflective, completely transparent, or partly transparent and partly opaque or reflective. As a third such example, a third lighting effect 122C may comprise an iridescence of a surface of a lit object 126, such as a colorful sheen that is visible only for a particular viewing perspective 120 relative to the lit object 126 and the position of the light source 116. Other such lighting effects 122 include, e.g., reflectiveness of surfaces such as mirrors; the translucency of partly transmissive surfaces; the color of tinted objects; and the luster and/or shininess of surfaces modeled with particular types of material.

In some scenarios, the scene designer 124 may utilize these lighting effects 122 created by the light source 116 and the viewing perspective 120 to alter the content of the rendering 112 of the scene 110. For example, luster, gloss, and/or reflectiveness, when viewed from the selected viewing perspective 120, may highlight a particular area 128 of a lit object 126 in a meaningful way. Similarly, the lighting of a scene 110, when viewed from the selected viewing perspective 120, may alter the aesthetic tone of the scene 110, and/or alter the perception of depth and/or scale of the objects 114 of the scene 110. Additionally, the scene designer 124 may choose lighting effects 122 to correct certain deficiencies in the scene 110; e.g., a visual flaw or an undesirable portion of an object model 108 may be hidden by positioning the light source 116 to create a glossy or lustrous lighting effect 122 when the scene 110 is rendered viewed from the selected viewing perspective 120. In this manner, the scene designer 124 may utilize lighting effects 122 to achieve a desired aesthetic result and/or alter the rendering 12 of the scene 110 in furtherance of a particular intent.

However, in such cases, the visual effects 122 may significantly depend upon the viewing perspective 120 that the scene designer 124 selected when designing the scene 110. If the scene 110 is rendered anew from a different perspective 120 (such as a different camera position, angle, or orientation), the rendering of lighting effects 122 upon the lit objects 124 of the scene 110 may change in a manner that is not consistent with the intent of the scene designer 124. For example, luster and transparency may change as the viewing perspective 120 changes, thereby invalidating the uses of lighting effects 122 such as highlighting, transparency, tone, perception of depth and/or scale, and/or hiding of portions of the scene 110, as intended by the scene designer 124. Additionally, the changed viewing perspective 120 may create new lighting effects 122 that the scene designer 124 did not attend, such as glare that obscures a significant portion of a surface of a lit object 124 and diminishes the visual appeal of the scene 110.

Figure 2:
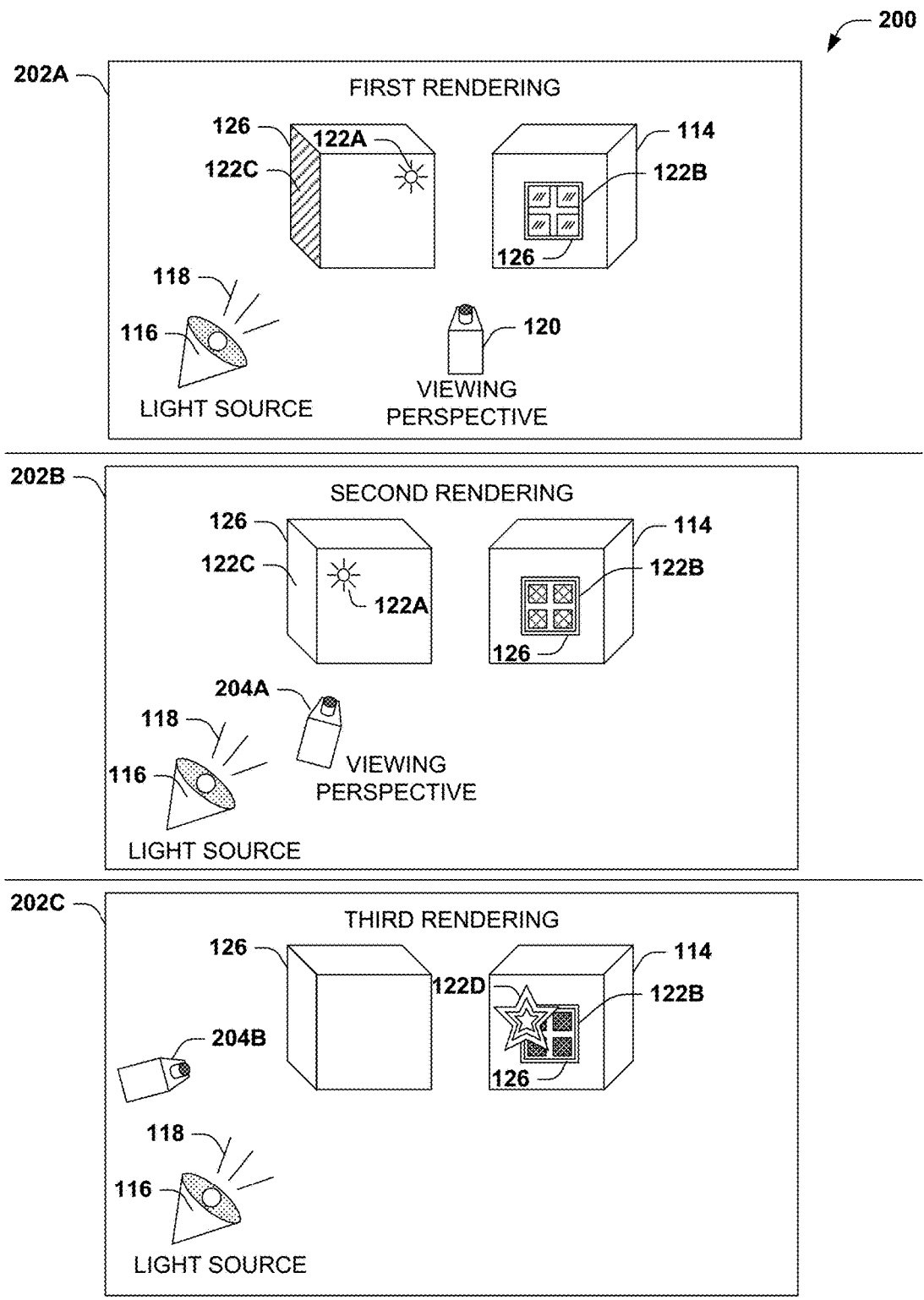
FIG. 2 is an illustration of an example scenario featuring a first technique for presenting renderings of a scene from various perspectives.

FIG. 2 is an illustration of an example scenario 200 depicting various renderings of a scene 110 from different viewing perspectives 120. In this example scenario 200, a first rendering 202A of the scene 110 is generated from a viewing perspective 120, wherein the position of the viewing perspective 120, relative to the objects 114 and the light source 116, produces a set of lighting effects 122 upon various lit objects 126, such as a gloss lighting effect 122A applied to a particular surface portion of a cube; a desired level of transparency lighting effect 122B of a window; and a colorful iridescence lighting effect 122C applied to a side surface of the cube. Such lighting effects 122 may have been specifically intended by a scene designer 124, e.g., to highlight the corner of the cube; to enable objects within the second cube to be visible through the window; and/or to accent the cube with a radiant iridescent color effect.

However, a second rendering 202B of the same scene 110 from a second viewing perspective 204A, such as closer to the objects 114 and from a different angle, causes the gloss lighting effect 122A to move to a different portion of the cube, and changes the transparency lighting effect 122B of the window, such as making the window appear more opaque and/or reflective, such that the objects within the second cube are no longer visible as intended by the scene designer 124. Additionally, the iridescence lighting effect 122C of the side of the cube may not be apparent from the second viewing perspective 204A, causing this lighting effect 122 to vanish from the scene 110. A third rendering 202C of the same scene 110 from a third viewing perspective 204B may cause the glossy spot lighting effect 122A to vanish, and/or may cause the transparency lighting effect 122B of the window to appear completely opaque and/or reflective. Additionally, the second perspective 204B may create new and unintended lighting effects 122, such as a bright glare 122D of the light source 116 off of a portion of the window, which may occlude a portion of the third rendering 202C and/or mar the quality of the third rendering 202C. In this manner, the re-rendering of the scene 110 from different viewing perspectives 204, including the light 116 cast upon the lit objects 126 by the light source 116, may undesirably alter, remove, or add lighting effects 122 in a manner that is inconsistent with the intent of the scene designer 124.

Figure 3:
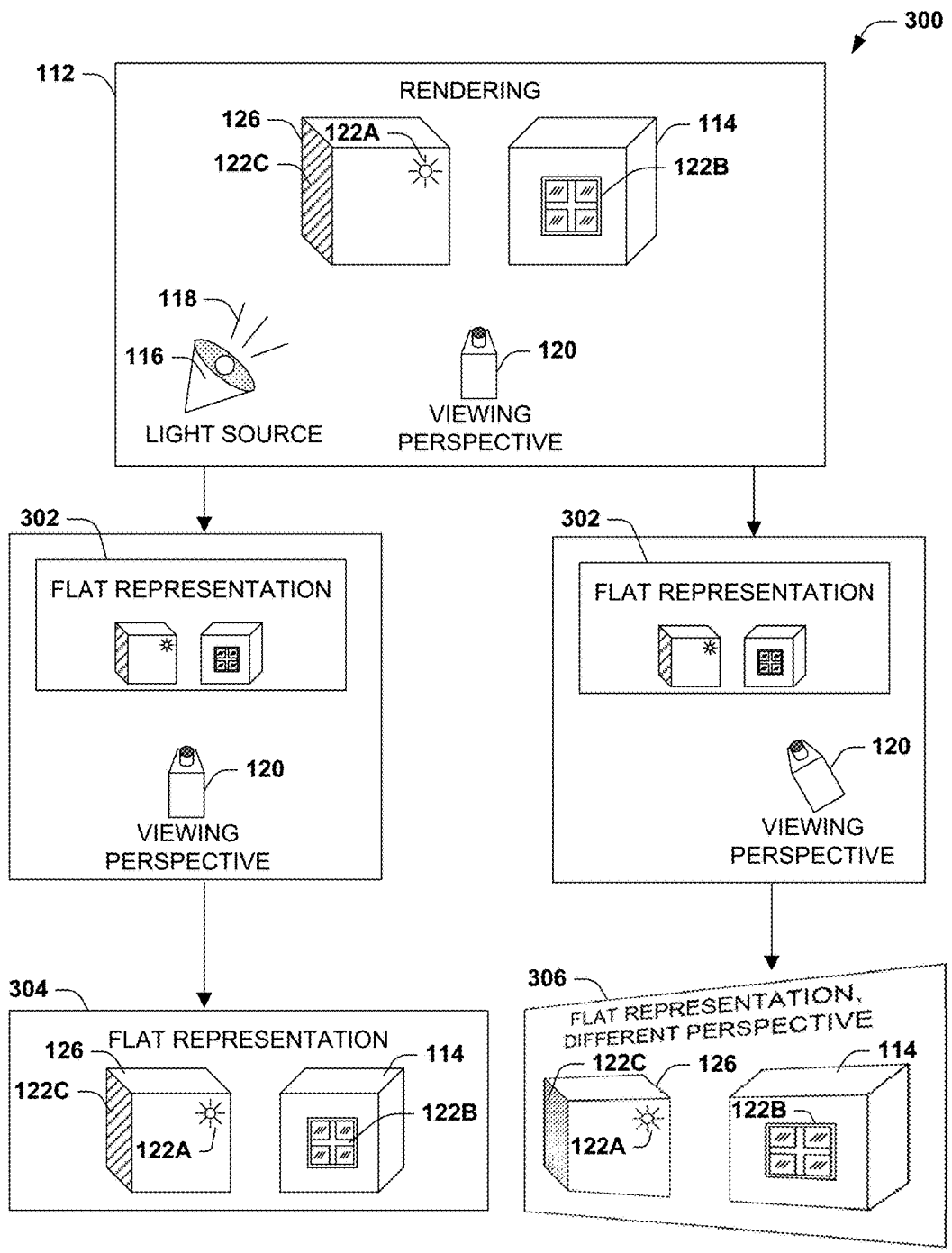
FIG. 3 is an illustration of an example scenario featuring a second technique for presenting renderings of a scene from various perspectives.

Other techniques may be utilized to reduce the undesired adaptation of the lighting effects 122 of the scene 110. FIG. 3 presents an example scenario 300 in which the lighting effects 122 of a rendering 112 of the scene 110 are preserved by rigidly maintaining the viewing perspective 120. In this example scenario 300, the rendering 112 from the viewing perspective 120 is transformed into a flat representation 302, such as a static two-dimensional image, in which the lighting effects 122 are fixed within the rendering 112. The flat representation 304 may be reproduced as a first rendering 304 of the scene 110 from the same viewing perspective 120. Some visual transformations may be applied to the flat representation 302 to simulate the movement of the viewing perspective 120, such as proportionally scaling the flat representation 302 up or down to simulate movement of the viewing perspective 120 closer to and/or further away from the objects 114. Moreover, the lighting effects 114 remain static in such transformations, thereby preserving the intent of the scene designer 124. However, some visual artifacts of the scaling process may diminish the visual quality of the second rendering 304, such as aliasing, poor resolution upon moving the viewing perspective 120 close to the objects 114, and a failure of the objects 114 to scale as the viewer may expect due to depth perception. Moreover, such transformations may be of limited value for other adjustments of the viewing perspective 120, and may exhibit significant deformity of the rendering 112. For example, if the viewing perspective 120 is displaced laterally, the flat representation 304 may disproportionately scaled to produce a simulated rendering 306 from a different perspective; however, such transformation distorts the geometry of the objects 114 with the rendering 112 and significantly degrades the visual quality of the rendering 112. Flattening the rendering 112 therefore limits, and in many cases eliminates, the availability of moving the viewing perspective 120 without significantly degrading the quality of the rendering 112.

Still other techniques may be utilized to balance the preservation of the lighting effects 122 and the capability of altering the viewing perspective 120 of the scene 110. As a first such example, the scene designer 124 may capture many flat representations 302 of the scene 110 from many different viewing perspectives 120, and may alter the lighting effects 122 in the rendering 112 form each such viewing perspective 120 to maintain the aesthetic intent of the scene designer 124. However, such may be prohibitively taxing of the time and attention of the scene designer 124, as well as undesirably processor- and storage-intensive. As a second such example, the capability of re-rendering the scene 110 from different viewing perspectives 204 as in the example of FIG. 2 may be constrained; e.g., a viewer may be permitted to move the viewing perspective 204 only a small increment from the viewing perspective 204 selected by the scene designer 124 in order to reduce the dynamic aspects of the lighting effects 122. However, such constraints may be disappointing to a viewer who wishes to explore and view the scene 110 from prohibited viewing perspectives 204. In this manner, the deficiencies arising from the dependence of the lighting effects 122 upon the viewing perspective 204 of the scene 110 may undesirably impact the quality of various renderings 202 of the scene 110, and/or may fail to preserve the aesthetic vision and intent of the scene designer 124 in the arrangement of the scene 110.

B. Presented Techniques

It may be appreciated that the dynamic nature of the lighting effects 122 in the example scenario 200 of FIG. 2 is caused by the dependence of the lighting effects 122 upon the position of the viewing perspective 204 relative to the light source 116 and the lit objects 126. That is, a user or process may request rendering of the scene 110 in order to view the scene 110 from different viewing perspectives 204, including viewing the objects 114 from different positions, angles, orientations, and/or distances. However, such a request may not include a desire to alter the lighting effects 122, and the user may be surprised to find the lighting effects 122 so altered. The user may be disappointed by the rendering 202 with the lighting effects 122 which, although accurate to the geometry of the object models and the scene 110, may diminish the quality of the rendering 202 and/or alter the aesthetic quality of the scene 110 that the scene designer 124 intended.

Presented herein are techniques for representing and rendering scenes 110 that may enable a robust capability of viewing the scene 110 from a variety of viewing perspectives 204, while also preserving the intent of the scene designer 124 regarding the arrangement and the lighting of the scene 110.

Figure 4:
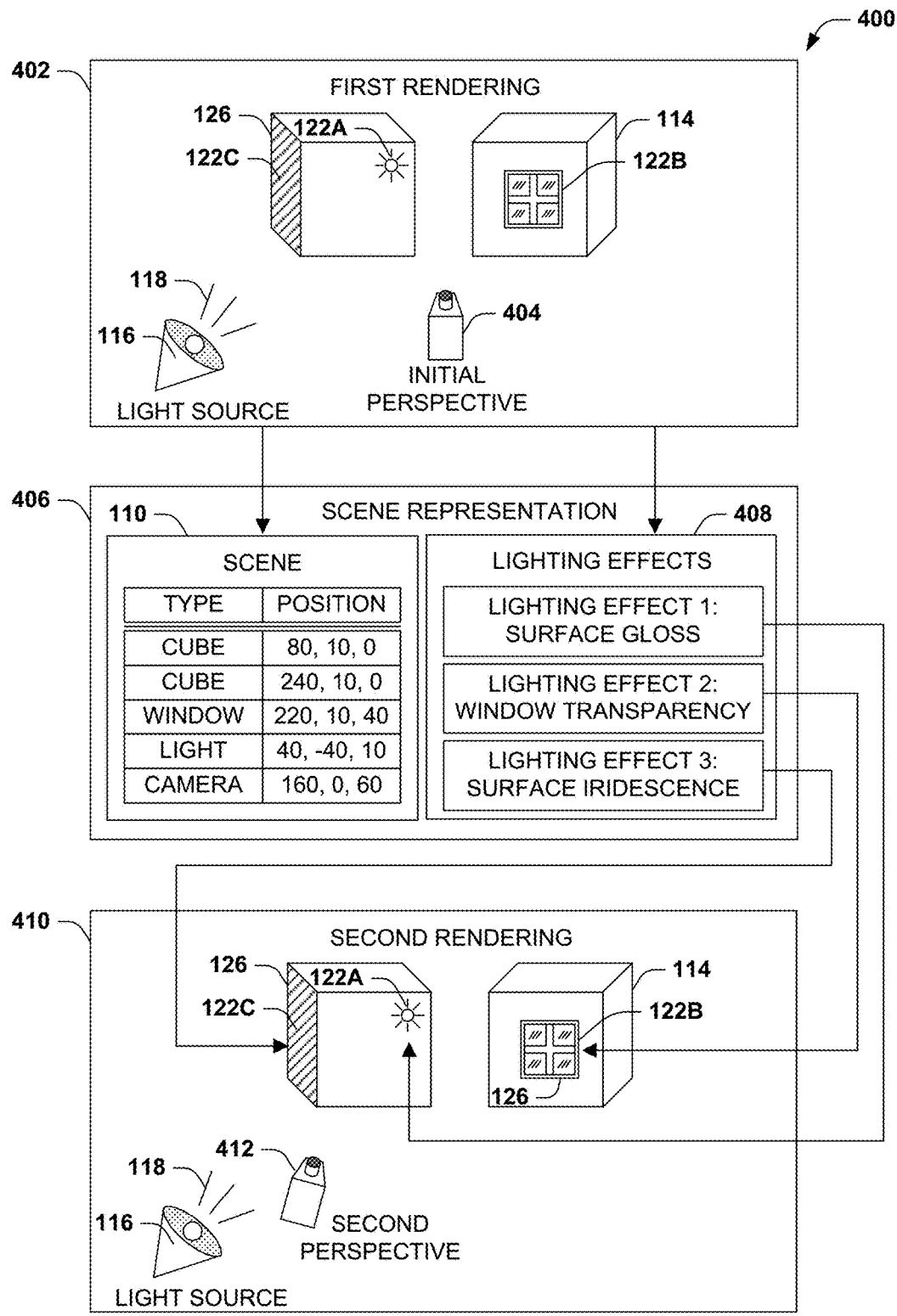
FIG. 4 is an illustration of an example scenario featuring a technique for presenting renderings of a scene from various perspectives in accordance with the techniques presented herein.

FIG. 4 is an illustration of an example scenario 400 featuring a rendering of a scene 110 comprising a set of objects 114, including a light source 116. In this example scenario 400, an initial perspective 404 of the scene 110 is identified, and a first rendering 402 of the objects 1124 of the scene 110 is generated. In the course of the first rendering 402, the simulation of light 118 cast upon various lit objects 126 produces a setoff lighting effects 122, including a first lighting effect 122A presenting a surface gloss upon a surface of a cube; a second lighting effect 1228 presenting a transparency level of a window; and a third lighting effect 122C presenting an iridescent sheen of a surface. A scene representation 406 is generated that comprises an object model of the scene 110 (e.g., a description of the number, types, positions, and other properties of the objects 114 of the scene 110), and also the lighting effects 408 that are created by the light source 116 upon the lit objects 126 of the scene 110. The lighting effects 408 may be stored, e.g., as an identification of the type of lighting effect; the lit object 126 upon which the lighting effect 408 is applied; and/or the properties of the lighting effect 408 (e.g., the position, size, shape, and intensity of the surface gloss applied to the cube; the degree of window transparency of the window; and the luminosity and color spectrum of the surface iridescence of the surface of the cube). Notably, the lighting effects 408 stored with the scene representations 406 describe the effect of the light 118 cast by the light source 16 upon the lit objects 126 when the scene 110 is rendered from the initial perspective 404.

When a request is received to generate a second rendering 410 of the scene 110 from a second perspective 412, the objects 114 of the scene may be rendered according to the second perspective 412. The lighting effects 408 stored with the scene representation 406 may be applied to the lit objects 126, such as applying the surface gloss to the same position on the cube as in the initial perspective 404; applying the same level of transparency to the window as in the initial perspective 404; and applying the same luminosity and color spectrum to the iridescent surface of the cube. The second rendering 410 of the scene 110 therefore presents the geometry of the objects 114 of the scene 110 when viewed from the second perspective 412, and also the lighting effects 122 of the initial perspective 404. This rendering process may therefore present the scene 110 in a manner that is consistent with the intent of a scene designer 124 in accordance with the techniques presented herein.

C. Technical Effects

Various uses of the techniques presented herein for rendering a scene 110 from a variety of perspectives may result in a variety of technical effects.

A first technical effect that is achievable according to the techniques presented herein involves preserving the visual properties of the scene 110 when viewed from an initial perspective 404 (such as may be intended by a scene designer 124), while also providing the capability of rendering the scene 110 from any second perspective 412. In addition to preventing the lighting effects 122 from changing in unpredicted and potentially undesirable ways, such techniques also reduce the introduction of unpredicted and potentially undesirable new lighting effects 122 that were not apparent from the initial perspective 404 but that are apparent from the second perspective 412, such as the introduction of glare that obscures a portion of the scene 110. Such techniques therefore maintain the consistency of the visual quality of the scene 110 when presented from various second perspectives 412.

A second technical effect that is achievable according to the techniques presented herein involves the generation of renderings 112 of the scene 110 with a distinctive aesthetic quality. It may be appreciated that a complete re-rendering of the scene 110 as presented in the example scenario 200 of FIG. 2 includes a dynamic adjustment of the lighting effects 122 presented within the scene 110. Although undesirable, such dynamic effects arise due to the accurate simulation of the light source 116 applied to the scene 110: i.e., the movement of the surface gloss lighting effect 122A over the surface of the cube as the viewing perspective 120 changes matches the real-world behavior of light 118 cast upon lit objects 126 when viewed from different viewing perspectives 120. By contrast, the presented techniques reduce the consistency of the lighting effects 122 with respect to real-world equivalent behavior, but do so in order to raise the visual quality of the rendered scene. That is, preserving the position of the surface gloss lighting effect 122A on the surface of the cube as the viewing perspective changes 120 may enable the scene designer 120 to produce more visually pleasing representations of the scene 110 than may be achieved by more accurate light models. Moreover, such rendering techniques may produce a distinctive and recognizable visual effect, which may be characteristic of a particular visual style and/or context. For example, the preservation of lighting effects 122 from the initial perspective 404 may be associated with curated presentations of a three-dimensional scene 110, and may inspire scene designers 124 to use lighting effects 122 to create new and interesting visual styles that are difficult to attain with rendering techniques featuring lighting effects 122 that undesirably change based upon the perspective 120 of the viewer.

A third technical effect that is achievable according to the techniques presented herein involves the efficiency of rendering the scene 110. Many rendering techniques involve a sophisticated and processor-intensive light rendering model, such as full-scene raytracing techniques that exhaustively simulate light rays cast from the light source; scenes 110 with a large numbers of light sources 116; and/or surfaces modeled with sophisticated lighting effects such as reflection, diffraction through water or transparent materials, translucency, and iridescence. In such scenarios, complete simulation of the light sources 116 within the scene 110 may be incompatible with the capabilities of the device 102 and/or the desired presentation, such as a realtime, consistently high-framerate rendering of the scene 110 on a mobile device with comparatively modest computational power and memory. The techniques presented herein may raise the efficiency of the rendering process by storing using the lighting effects 122 generated by various slight sources 116, and then reapplying such lighting effects 122 to the lit objects 114 when rendered from a second perspective 412, rather than completely re-simulating the light source 116 within the scene 110.

A fourth technical effect that is achievable according to the techniques presented herein involves the additional capabilities of adapting the lighting effects 122 within a rendering 202 of the scene 110 to match a context in which the scene is presented. For example, one or even several renderings 202 of different scenes 110 may be integrated with a user interface of a computing environment, and the lighting effects 408, stored as discrete elements, may be distinctively adapted to match the computing environment (e.g., scaling glossy lighting effects up or down based on the glossiness of the overall computing environment). Such adaptations are efficiently achievable, without necessarily re-rendering the entire scene 110, due to the distinct storage of the lighting effects 408 as part of the scene representation 406. Many such technical effects may be achievable by the rendering of scenes 110 according to the techniques presented herein.

D. Example Embodiments

Figure 5:
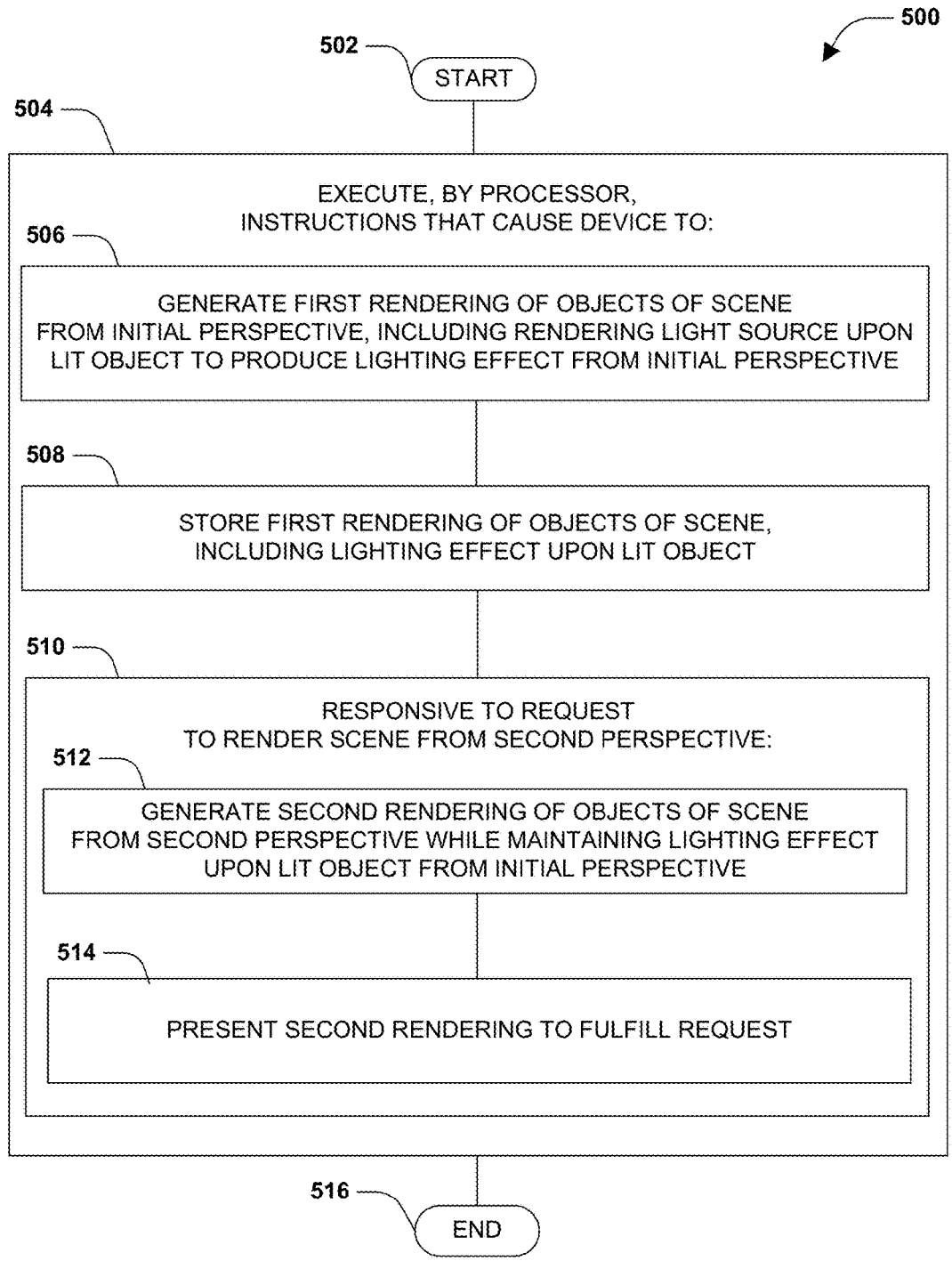
FIG. 5 is an example method of presenting a scene from various perspectives in accordance with the techniques presented herein.

FIG. 5 is an illustration of an example method 500 of presenting a scene 110 of objects 114 lit by a light source 116 in accordance with the techniques presented herein. The example method 500 may be implemented, e.g., as a set of instructions stored in a memory component of a device, such as a memory circuit, a platter of a hard disk drive, a solid-state storage device, or a magnetic or optical disc, and organized such that, when executed on a processor of the device, cause the device to operate according to the techniques presented herein.

The example method 500 begins at 502 and involves executing 504 the instructions on a processor of the device. Specifically, executing 504 the instructions on the processor causes the device to generate 506 a first rendering 402 of the objects 114 of the scene 110 from an initial perspective 404, including rendering the light source 116 upon a lit object 126 to produce a lighting effect 122 from the initial perspective 404. Executing 504 the instructions on the processor also causes the device to store 508 the first rendering 402 of the objects 114 of the scene 110, including the lighting effect 122 upon the lit object 114. Executing 504 the instructions on the processor also causes the device to, responsive 510 to a request to render the scene 110 from a second perspective 412, generate 512 a second rendering 410 of the objects 114 of the scene 110 from the second perspective 412 while maintaining the lighting effect 122 upon the lit object 114 from the initial perspective 404. Executing 504 the instructions on the processor also causes the device to present 514 the second rendering 406 to fulfill the request. Having achieved the presentation of the scene 110 from the second perspective 412 while preserving application of the lighting effects 122 to the lit objects 126 as viewed from the initial perspective 404, the example method 500 achieves the rendering of the scene 110 in accordance with the techniques presented herein, and so ends at 516.

Figure 6:
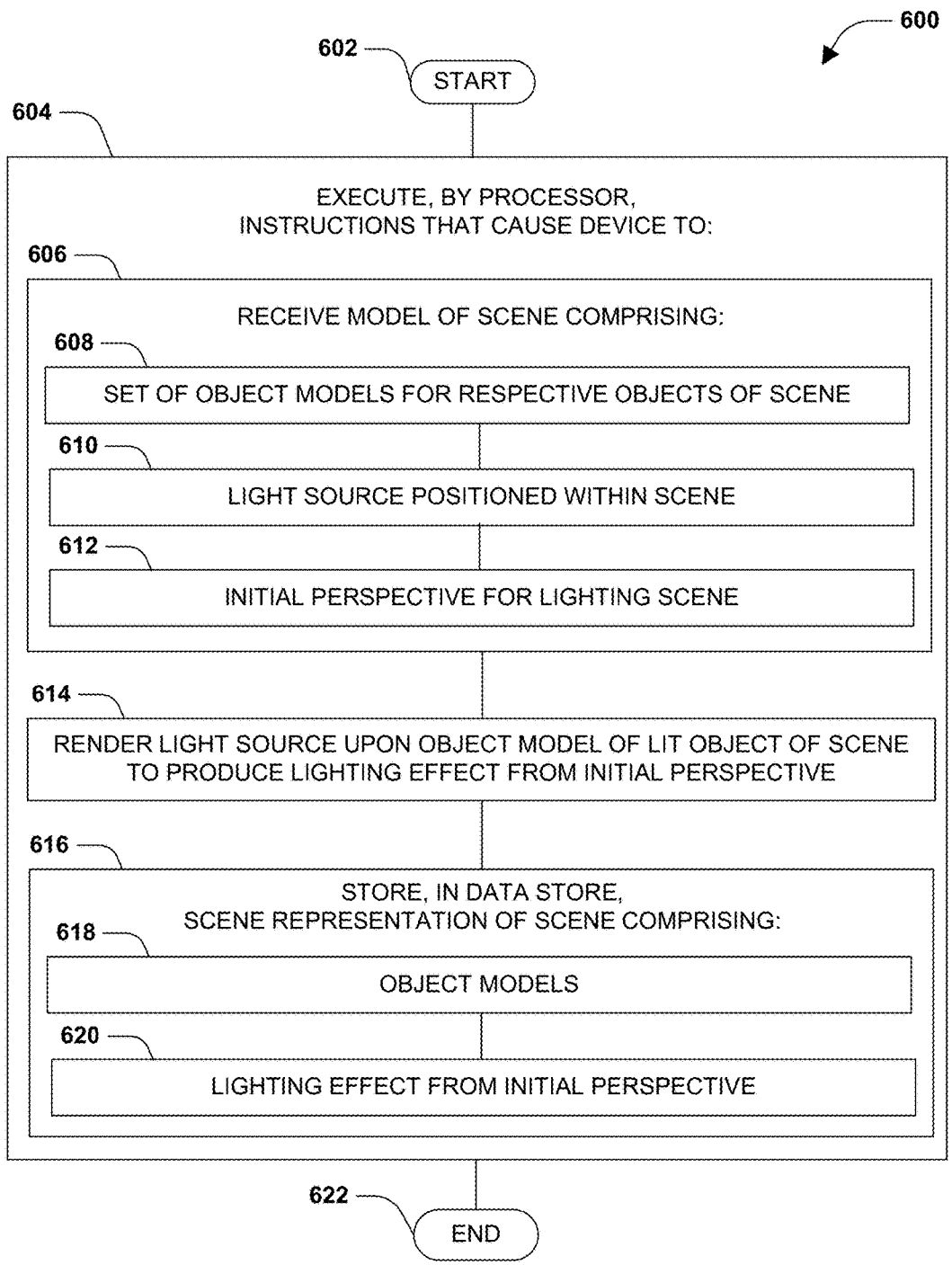
FIG. 6 is an example method of representing a scene that is presentable from various perspectives in accordance with the techniques presented herein.

FIG. 6 is an illustration of an example method 600 of representing a scene 110 of objects 114 in accordance with the techniques presented herein. The example method 600 may be implemented, e.g., as a set of instructions stored in a memory component of a device, such as a memory circuit, a platter of a hard disk drive, a solid-state storage device, or a magnetic or optical disc, and organized such that, when executed on a processor of the device, cause the device to operate according to the techniques presented herein.

The example method 600 begins at 602 and involves executing 604 the instructions on a processor of the device. Specifically, executing 604 the instructions on the processor causes the device to receive 606 a scene representation 406 of the scene 110, comprising a set 608 of object models 108 for the respective objects 114 of the scene 110; a light source 610 positioned within the scene 110; and an initial perspective 612 for lighting the scene 110. Executing 604 the instructions on the processor also causes the device to render 614 the light source 116 upon an object model 108 of a lit object 116 of the scene 110 to produce a lighting effect 122 from the initial perspective 404. Executing 604 the instructions on the processor also causes the device to store 616, in the data store, a scene representation 406 of the scene 110 that comprises the object models 618 and the lighting effect 620 from the initial perspective 404. Having generated the representation of the scene 110 in a manner that may be re-rendered to present the scene 110 from a second perspective 412 while preserving the application of the lighting effects 122 to the lit objects 126 as viewed from the initial perspective 404, the example method 600 achieves the representation of the scene 110 in accordance with the techniques presented herein, and so ends at 622.

Figure 7:
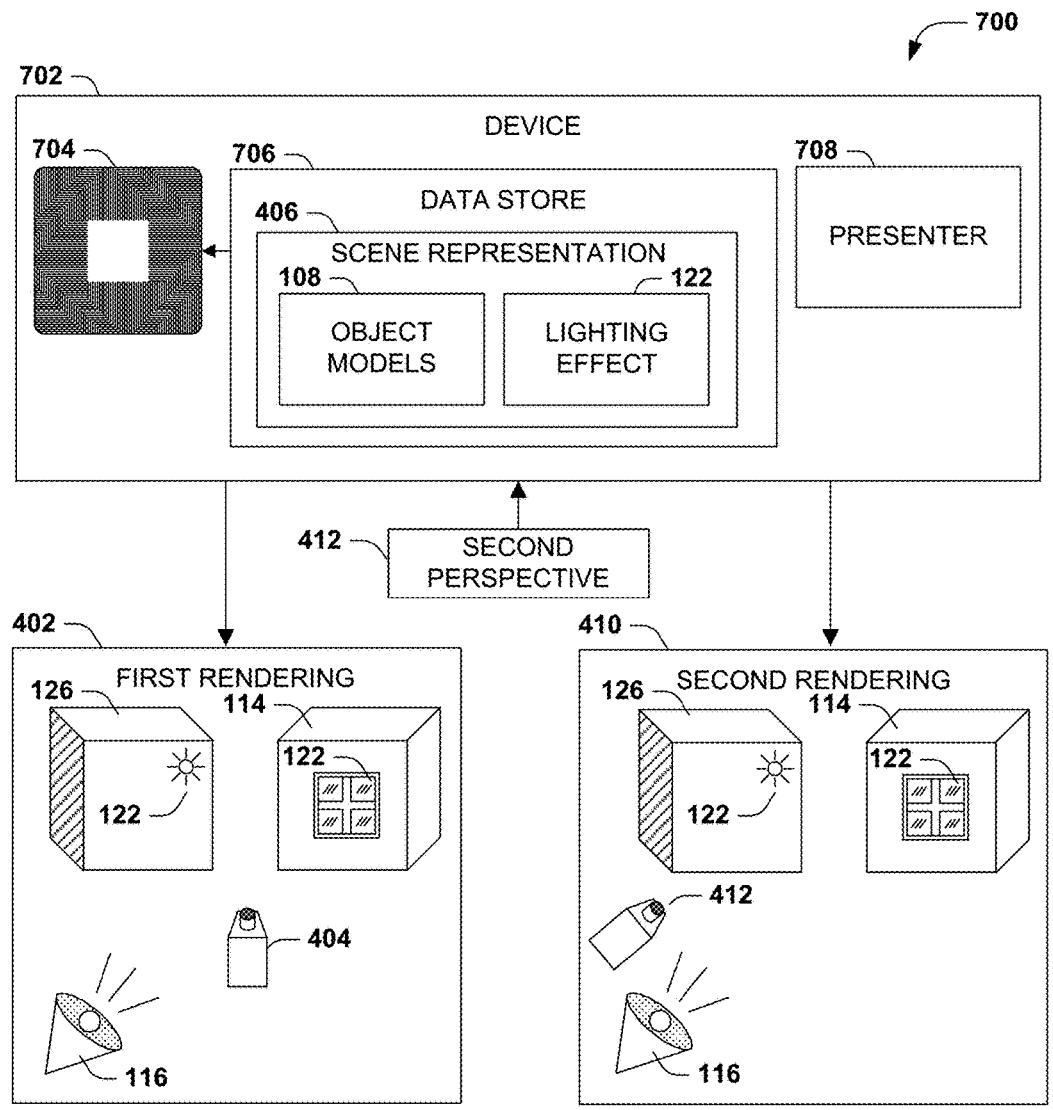
FIG. 7 is an example device that presents a scene from various perspectives in accordance with the techniques presented herein.

FIG. 7 is an illustration of an example scenario 700 featuring an example device 702 that presents a scene 110 of objects 114 from various perspectives 120 in accordance with the techniques presented herein. In this example scenario 700, the example device 702 comprises a processor 704, a presenter 708 such as a display, and a data store 706 storing instructions that, when executed by the processor 704, cause the example device 702 to operate according to the techniques presented herein.

More particularly, in this example device 702, the data store 706 stores a scene representation 406 of the scene 110, comprising a set of object models 108 of the respective objects 114 of the scene 110, and a lighting effect 122 generated upon a lit object 126 of the scene 110 by a light source 116 when rendered from an initial perspective 404. For example, using the example method 600 of FIG. 6, the device 702 may initially render the scene 110 from the initial perspective 404, where the initial rendering 402 includes the generation of one or more lighting effects 122 cast upon lit objects 126 by the light source 116 when the scene 110 is viewed from the initial perspective 404, and, using the initial rendering 402, may generate and store the scene representation 406 including the object models 108 and the lighting effects 122. The example device 702 of FIG. 7 is further configured to, using the processor 704, generate a rendering of the scene 110 from a second perspective 412, by rendering the object models 108 of the respective objects 114 from the second perspective 412, and rendering the lighting effect 122 upon the lit object 126 maintained from the initial perspective 116. The presenter 708 of the example device 702 presents (e.g., to a user viewing a display) the rendering of the scene 110 from the second perspective 412, including the lighting effect 122 cast upon the lit object 126 when viewed from the initial perspective 404. In this manner, the example device 702 of FIG. 7 presents the scene 110 of objects 114 from various perspectives 120 in accordance with the techniques presented herein.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 8:
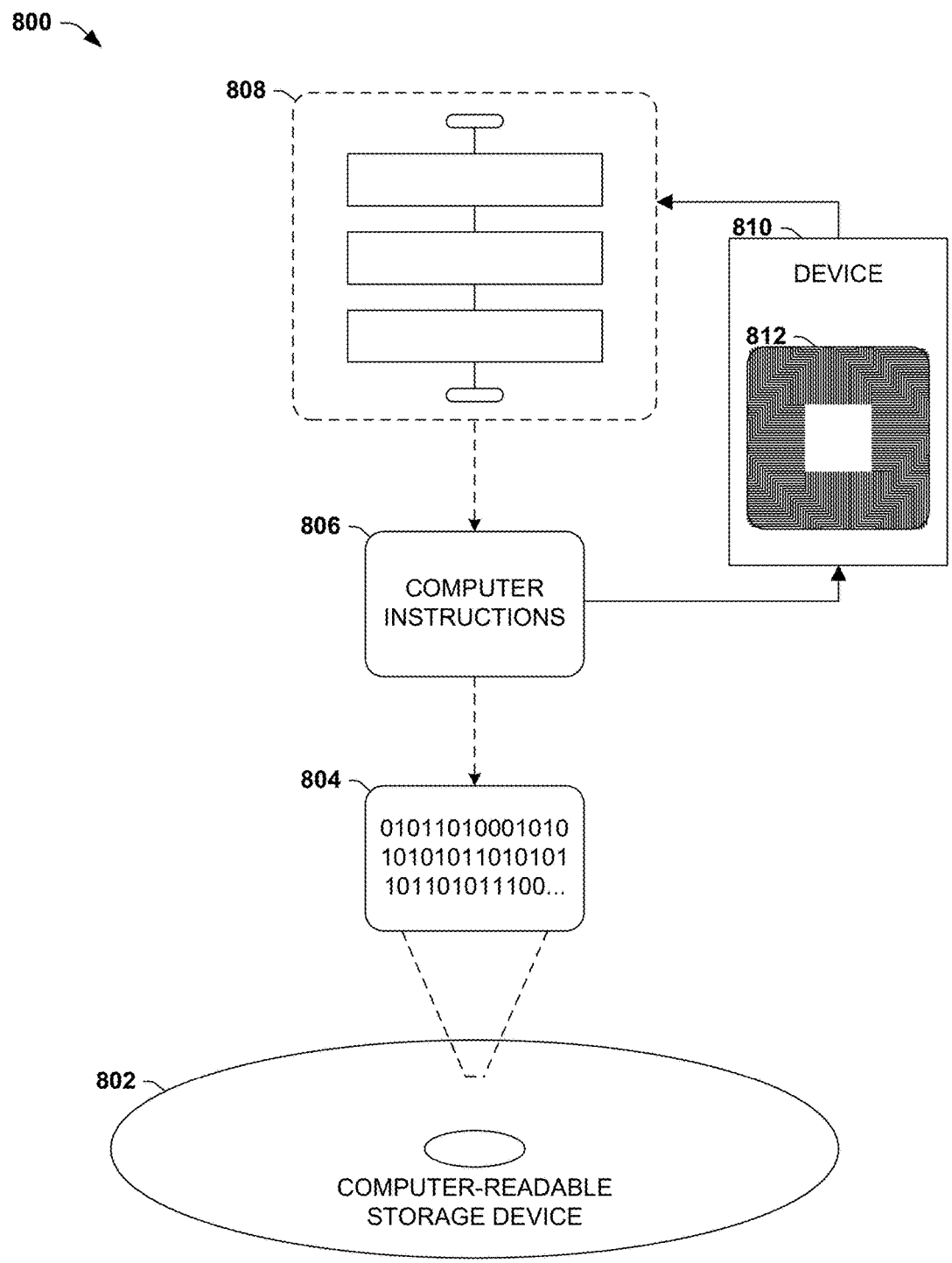
FIG. 8 is an illustration of an example computer-readable storage device storing instructions that cause a device to render a scene from various perspectives in accordance with the techniques presented herein.

An example computer-readable medium that may be devised in these ways is illustrated in FIG. 8, wherein the implementation 800 comprises a computer-readable memory device 802 (e.g., a CD-R, DVD-R, or a platter of a hard disk drive), on which is encoded computer-readable data 804. This computer-readable data 804 in turn comprises a set of computer instructions 806 that, when executed on a processor 808 of a device 810, cause the device 810 to operate according to the principles set forth herein. In a first such embodiment, the processor-executable instructions 806 of the computer-readable storage device 802 may provide a method of presenting a scene in accordance with the techniques presented herein, such as the example method 500 of FIG. 5. In a second such embodiment, the processor-executable instructions 806 of the computer-readable storage device 802 may provide a method of generating a scene representation of a scene in accordance with the techniques presented herein, such as the example method 600 of FIG. 6. In a third such embodiment, the processor-executable instructions 806 may comprise a portion of a device that presents a scene in accordance with the techniques presented herein, such as the example device 702 of FIG. 7. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 500 of FIG. 5; the example method 600 of FIG. 6; the example device 702 of FIG. 7; and/or the example computer-readable storage device 802 of FIG. 8) to confer individual and/or synergistic advantages upon such embodiments.

As a first such variation, the techniques presented herein may be utilized with a variety of devices 104, such as workstations; laptops; tablets; mobile phones; game consoles and portable gaming devices; portable or non-portable media players; media display devices such as televisions, appliances; home appliance and automation devices; and computing components integrated with a wearable device integrating such as eyewear or a watch.

As a second such variation, the techniques presented herein may be utilized with a variety of scenes 110 and objects 114 presented therein, such as video games and other interactive media; non-interactive presentations, such as graphically rendered movies; static object sets, such as libraries of object models 108; and the elements comprising a user interface. The scene 110 may also comprise a reproduction of objects in a real-world environment, such as a scanning of live objects that may be reproduced, concurrently or subsequently, using graphical representations of the objects 114. The scene 110 may also comprise two-dimensional objects 114 that are rendered within a three-dimensional scene to apply a lighting effect 122 when viewed from the initial perspective 404, which may be persisted when the two-dimensional object 114 is presented in a different context and from a second perspective 412. The scene may also comprise a simulation and rendering of objects 114 in the context of scientific studies, such as engineering simulations. The scene may also be presented in various ways, including a virtual reality presentation using a headset, and/or an augmented reality presentation that integrates graphical representations of objects with live images of a local environment of a user.

As a third such variation, the techniques presented herein may utilize various light sources 116, such as simulations of sunlight, fire, explosions, natural and/or artificial luminescence, light bulbs, and lasers. Such light sources 116 may also exhibit a variety of properties of the resulting light 118, such as intensity, wavelength, focus and/or diffusion, focal length, lensing, and constructive and/or destructive interference patterns, as well as variations thereof, such as strobing effects. Additionally, the light 18 of the light source 116 may be rendered upon the lit objects 126 using various lighting techniques, including raytracing, shading, additive and/or subtractive blending, subsurface scattering and transport, refraction through surfaces such as glass and water, and conduction such as fiber optics.

As a fourth such variation, the initial perspective 404 and the second perspective 412 may be selected using various techniques. As a first such example, a user, such as a scene designer 124, may specify the initial perspective 404 for generating the lighting effect 122. Alternatively, the initial perspective 404 may be specified by a process and/or arbitrarily selected. As a second such example, the second perspective 412 may be selected by a user (e.g., using a pointing device such as a mouse or controller); may be controlled by a sensor of a device, such as an orientation sensor of a virtual reality headset or a gyroscope or tilt sensor of a mobile device; and/or may be specified by a process, such as a perspective track that conveys the perspective through the scene 110. Many such scenarios may be devised in which the objects 114 of a scene 110 may be rendered using the techniques presented herein.

E2. Lighting Effect Representation

A second aspect that may vary among embodiments of the techniques presented herein is the representation and storage of information about lighting effects 122 created by a light source 116 upon a lit object 126 when viewed from an initial perspective 404 of the scene 110.

Figure 9:
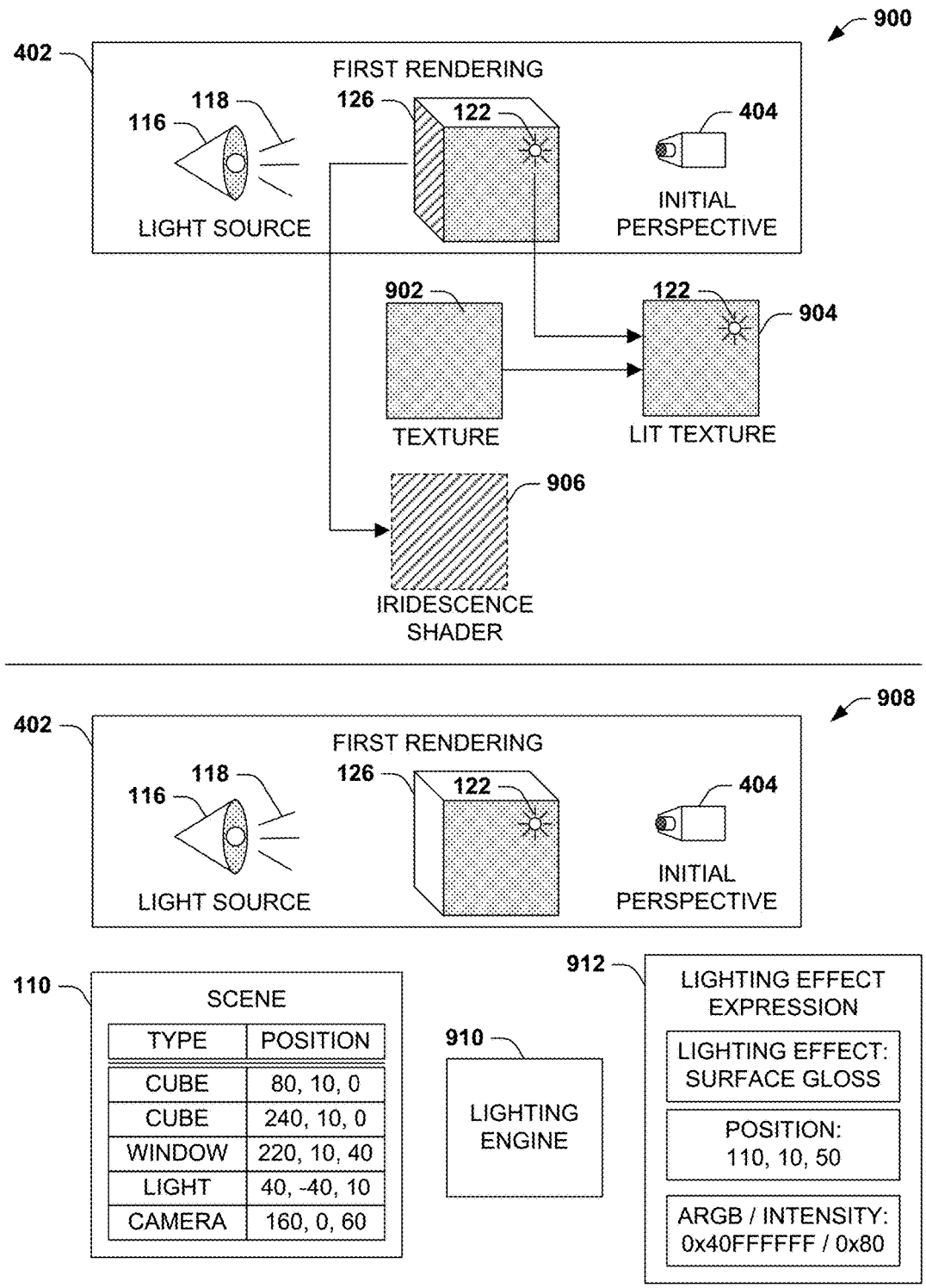
FIG. 9 is an illustration of an example scenario featuring various techniques for storing a lighting effect of a light source upon a lit object from an initial perspective in accordance with the techniques presented herein.

FIG. 9 presents an illustration of a first variation of this second aspect, involving various techniques for representing the lighting effect 122 stored with the scene representation 406.

As a first such example 900, an object model 108 of the lit object 126 may further comprise a texture 902, such as a bitmap or bump map applied over a geometric surface of the object model 108. While rendering the light source 116 upon the object model 108, the device may alter the texture 902 of the lit object 126 to produce a lit texture 904 that incorporates the lighting effect 122 from the initial perspective 404. In addition to rendering the lit texture 904 over the object model 404 to produce the first rendering 402, the device may store the lit texture 904 of the lit object 126 that incorporates the lighting effect 122 in the scene representation 406. The lit texture 904 may then be reused in a second rendering 410 from a second perspective 412, thereby maintaining, in the second rendering 410, the lighting effect 122 presented from the initial perspective 404.

As a second such example, the lighting effect 122 may be stored in the scene representation 406 as a lighting effect result. For example, rather than integrating the lighting effect 122 with the texture 902, the device may store the lighting effect 122 as a decal that may be applied to the lit object 126 during the second rendering 410. Storing the lighting effect 122 as a decal may be advantageous, e.g., if the texture 902 applied to the lit object 126 animates or is dynamically generated during the second rendering 410. As another example, if the lighting effect 122 comprises a layer that is applicable to the object 122, the layer may be stored in the scene representation 406 and included in the rendering pipeline of the lit object 126 during the second rendering 410. For example, an iridescent lighting effect 122 of a surface of the lit object 126 may be graphically as an iridescence shader 906 that is applied over the surface during rendering. The iridescence shader 906 may be stored in the scene representation 406 as the lighting effect 122 from the initial perspective 404. During the second rendering 410, rather than re-processing the iridescence lighting effect 122 from the second perspective 408, the device may reapply the iridescence shader 906 to the surface, thereby preserving the lighting effect 122 from the initial perspective 404.

As a third such example 908, rather than storing a graphical representation or result of the lighting effect 122, the device may store, in the scene representation 406, a lighting effect expression 912 of a lighting calculation performed by a lighting engine 910. During the first rendering 402 of the scene 110, a lighting engine 910 may evaluate the data comprising the scene 110 to generate a lighting effect expression 912 for rendering the lighting effect 122 upon the object model 108 of the lit object 126 from the initial perspective 404, such as a description of the type, intensity, colors, and position of the lighting effect 122 within the scene 110 and upon the surface of the lit object 126. The device may store the lighting effect expression 912 of the lighting effect 122 in the scene representation 406, and subsequently utilize the lighting effect expression 912 to re-render the lighting effect 122 upon the surface of the lit object 126 during the second rendering 410. This variation may be advantageous, e.g., if the surface of the lit object 126 is highly dynamic, such as having a fluid shape, where re-rendering the graphical representation of the lighting effect 122, while still reflecting the initial perspective 404 rather than the second perspective 412 of the second rendering 412, may exhibit greater conformity with the surface of the lit object 126.

As a second variation of this second aspect, additional information may be stored in the scene representation 406 that further describes the scene 110 that relates to the lighting effect 122 of the lit object 126 from the initial perspective 404.

As a first such example, the light source 116 may be defined by a light source information set, such as a description of the type, color, and focus of the light, and the scene representation 406 may also store the light source information set. Such storage may later be used during the second rendering 410, e.g., to adapt the lighting effect 122 applied to the lit object 126. For example, if the lighting effect 110 is emitted by a green light source 116, and the second rendering 410 further includes a red light, additive color mixing may be applied to the green color of the light source 116 indicated by the light source information set and the red color of the second rendering 410 to adjust the hue of the light effect 122 to yellow. Such tinting may reflect some changes to the scene 110 during the second rendering 410, while otherwise preserving the rendering of the lighting effect 122 from the initial perspective 404 rather than the second perspective 412 of the second rendering 410.

As a second such example, the object model 108 of the lit object 126 may further comprise surface information describing a surface of the object model 108 upon which the lighting effect 122 of the light source 116 is visible from the initial perspective 404. The surface information may be stored in the scene representation 406, and used to adjust the lighting effect 122 during the second rendering 410. For example, the surface information may indicate that a translucency lighting effect 122 is caused by a translucency of the surface material, and that the surface translucency changes based on variations of the light source 116 (e.g., hue, intensity, or polarity). In addition to presenting the second perspective 412, the second rendering 410 may include an adjustment of the light source 116 in order to match a surface alteration of the surface, such as the translucency of the surface material. The second rendering 410 may therefore adjust the lighting effect 122 to match the effect of the light source 116 based upon the translucency of the surface material of the lit object 126, while preserving the lighting effect 122 presented from the initial perspective 404 rather than the second perspective 412.

As a third variation of this second aspect, many techniques may be utilized to capture the lighting effects 122 of the light source 116 from the initial perspective 404. As a first such example, a first rendering 402 of the scene 110 may be generated at a first time, and the lighting effects 122 may be stored in volatile or nonvolatile memory for later use. At a later time, a second rendering 410 of the scene 110 may include the previously captured and stored lighting effects 122. Alternatively, the first rendering 402 may be performed on a just-in-time basis, and the lighting effects 122 based upon the initial perspective 404 may be captured and incorporated in promptly following further renderings of the scene 110 from a second perspective 412. As a second such example, the first rendering 402 of the scene 110 may be performed completely (e.g., completing the entire rendering pipeline to generate a full visual representation of the scene 110). Alternatively, the first rendering 402 of the scene 110 may be reduced to the rendering processes that generate the lighting effects 122 from the initial perspective 404. Other steps of the rendering process may be performed in a simplified manner, and/or removed from the first rendering 402, particularly if such steps are not relevant to the rendering of the lighting effects 122 from the initial perspective 404. Many such techniques may be utilized to generate and capture the lighting effects 112 within the scene 110 from the initial perspective 404, for incorporation into the second rendering 410, in accordance with the techniques presented herein.

E3. Applying Lighting Effect Within Second Rendering

A third aspect that may vary among embodiments of the techniques presented herein involves the application of the lighting effect 122 to the lit object 126 during the second rendering 410 of the scene 110.

Figure 10:
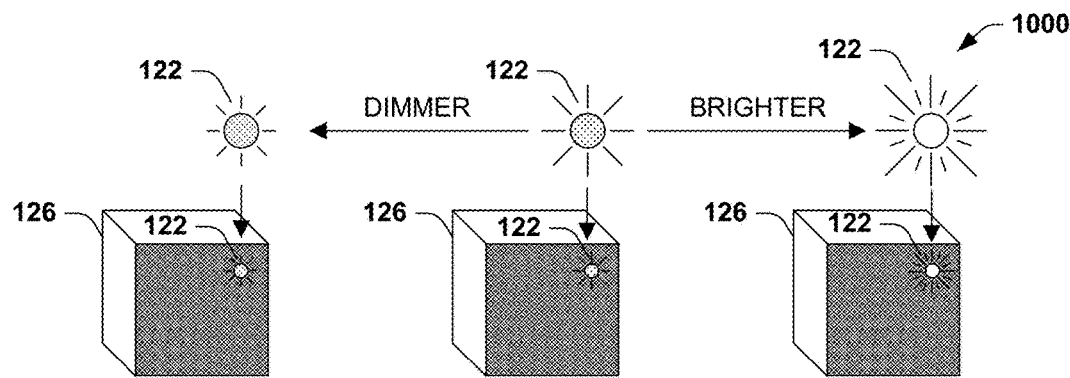
FIG. 10 is an illustration of an example scenario featuring a lighting adjustment of a lighting effect applied to a surface of a lit object from an initial perspective in accordance with the techniques presented herein.

FIG. 10 presents an illustration of an example scenario 1000 featuring a first variation of this third aspect, involving a lighting effect alteration to be applied to the lighting effect 122. In this example scenario 1000, the lighting effect is represented as a decal that may be rendered onto the surface texture of a lit object 126 to present a surface gloss lighting effect 122 from the initial perspective 404 of the first rendering 402. The device may receive a request to adjust the lighting effect 122, such as increasing or decreasing the brightness of the surface gloss. As one such example, the computing environment of the device may utilize a visual context that includes a glossiness adjustment as a spectrum between a high-gloss presentation and a low-gloss presentation. It may be desirable to adjust the presentation of the gloss lighting effects 122 of the scene 110 to match the gloss setting of the computing environment. Accordingly, responsive to receiving the lighting effect alteration of the lighting effect 122, the device may apply the lighting effect alteration to the lighting effect 122 (e.g., increasing or decreasing the brightness and/or size of the decal), and generate a third rendering of the objects 108 of the scene 110 that includes the lighting effect 122, altered by the lighting effect alteration, to the lit object 126.

As a second variation of this third aspect, the second rendering 410 of the scene 110 may include an animation of the lit object 126, and the lighting effect alterations may comprise an animation frame lighting effect adjustment that matches the particular animation frame of the lit object 126. For instance, an animation of the lit object 126 may include a cyclically varying translucency of the object surface, and the animation frame lighting effect alteration of respective animation frames may comprise a variance in the surface translucency. The device may therefore applying the animation frame lighting effect alteration of the lighting effect 112, based upon the selected animation frame of the animation of the lit object 126, in order to achieve the animation effect.

As a third variation of this third aspect, the device may present a toggle option that toggles the lighting effect 122 between the second rendering 410 that maintains the lighting effect 122 upon the lit object 126 from the initial perspective 404, and a third rendering that re-renders the light source 116 to present the lighting effect 112 when viewed from the second perspective 412. The toggle option may enable the alternate selection of either the application of the lighting effect 112 upon the lit objects 126 from the initial perspective 404 (e.g., according to the intent of the scene designer), and a different rendering process where all lighting and lighting effects 112 are cast upon the lit objects 126 according to a current perspective of the viewer. Responsive to a selection of the toggle option that selects the third rendering, the device may generate the third rendering of the objects 114 of the scene 110 from the second perspective 412, including rendering the light source 116 upon the lit object 126, to produce the lighting effect 122 from the second perspective 412.

As a fourth variation of this third aspect, the device may blending the lighting effect 122 maintaining the initial perspective 404 of the first rendering 402 with a second lighting effect upon the lit object 126 rendered from the second perspective 116. That is, the lighting effects 112 of the lit object 126 may present a blended combination of lighting effects 112 from the initial perspective 404 and from the second perspective 412 of the second rendering 410. Many such presentations and adaptations of the lighting effect 122 presented within the second rendering 410 may be utilized in accordance with the techniques presented herein.

E4. Integrated Presentations of Multiple Scenes

A fourth aspect that may vary among embodiments of the techniques presented herein involves an integration presentation of scenes 110. Such techniques may be advantageous, e.g., for enabling one or more applications to generate renderings of various scenes 110 that may be presented together in a shared context, where the lighting effects 112 upon the lit objects 126 of the respective scenes 110 are maintained from an initial perspective 404 of each such scene 110.

Figure 11:
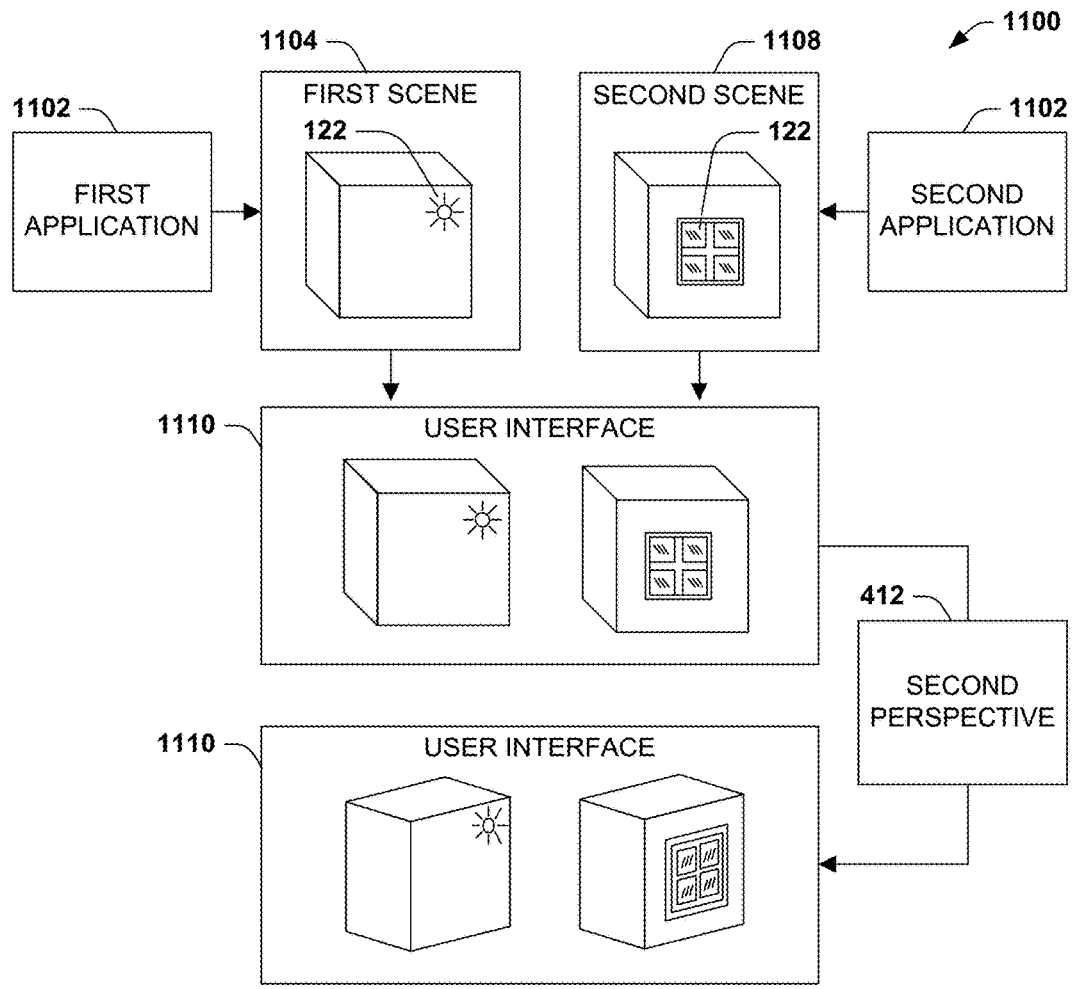
FIG. 11 is an illustration of an example scenario featuring a presentation and synchronous adjustment of scenes presented from different applications and integrated with a user interface in accordance with the techniques presented herein.

FIG. 11 presents an illustration of an example scenario 1100 in which a first application 1102 produces a first scene 1104 including a first lighting effect 112 rendered upon a first lit object 126, and a second application 1102 produces a second scene 1104 including a second lighting effect 112 rendered upon a second lit object 126. A first rendering of the first scene 1104 and a second rendering of the second scene 1108 may be generated, and integrated to produce an integrate rendering of both scenes 110, such as within a user interface 1110 that depicts both lit objects 126.

Additionally, many adjustments of the integrated rendering may be received, and may applied separately either to individual scenes 110, or synchronously to two or more such scenes 110 of the integrated rendering. As a first variation of this fourth aspect, responsive to receiving an altered second perspective 412 (e.g., a request to shift the second perspective 412 of the first scene 1104), the device may re-renders the object models of the respective objects 110 of the first scene 1104 from the altered second perspective 412, and re-render the lighting effect 122 upon the lit object 126 maintained from the initial perspective 404 of the first scene 1104. The device may then integrate the re-rendering of the first scene 1104 and the second rendering of the second scene 1108 (for which the individual second perspective 412 is maintained) to produce a second integrated rendering. Alternatively, and as depicted in the example scenario 1100 of FIG. 11, the adjusted second perspective 412 may be applied synchronously to both scenes 110 by re-rendering the first scene 1104 and the second scene 1108 form the altered second perspective 412, and integrating the re-rendered presentations. For example, the first scene 1104 and the second scene 1108 may each depict the lighting effects 122 of upon the lit objects 126 from a shared initial perspective 404, and a request to shift to a second perspective 412 (e.g., laterally displacing the viewpoint) may result in a synchronous shift of the second perspective of the lit objects 126 of both scenes 110, while the lighting effects 122 of both scenes 110 are maintained from the initial perspective 404.

As a second variation of this fourth aspect, lighting effect alterations may be applied to individual scenes 110 of an integrated rendering. For example, the device may apply the lighting effect alteration to the lighting effect 122 of the first 1104; re-render the lighting effect 112 altered according to the lighting effect alteration upon the lit object 126 of the first scene 1104; and integrate the re-rendering of the first scene 1104 with the second rendering of the second scene 1108, thereby producing a second integrated rendering that applies the lighting effect alteration to the lit object 126 of the first scene 1104 while maintaining the lighting effect 122 of the second scene 1108. Alternatively, a lighting effect alteration may be applied synchronously to both scenes 110 of the integrated rendering. e.g., by applying the lighting effect alteration to the lighting effects 122 of the respective scenes 110; re-renders the lighting effects 112, altered according to the lighting effect alteration, upon the lit objects 126 of both scenes 110; and integrating the re-rendering of the first scene 1104 and the second scene 1108 to produce a second integrated rendering that consistently applies the lighting effect alteration to both scenes. The integration of multiple scenes 110 may also maintain distinct geometric spaces in the respective scenes 110 (e.g., changing the second perspective 410 of a collection of scenes 110 may result in each scene 110 reorienting the geometry and spatial arrangement of the objects 126, as well as the lighting effects 112, of the scene 110. Alternatively, the integration may merge the spatial arrangements of the individual scenes 110 to produce a composite scene 110, where adjustments of the second perspective 410 also reorient the objects 126 and/or lighting effects 124 of the scenes 110 relative to the objects 126 of other scenes 110. The spatial arrangements may also be adjusted with respect to the visual context in which the scenes 110 are incorporated; e.g., as a user visually navigates within a user interface that incorporates a scene 110, the second perspective 410 within the scene 110 may also shift. Alternatively, visual navigation within the user interface may be distinct from navigation within one or more scenes 110 integrated therein.

As a third variation of this fourth aspect, lighting effects 122 and/or light sources 116 within a scene 110 may be isolated to the respective scene 110, including separating the lighting effects 122 and/or the light sources 116 from the user interface and other scenes 110 that may be integrated therein. Alternatively, the lighting effects 122 and/or light sources 116 of the user interface may be incorporated in a scene 110 embedded therein, either complementary to or instead of the lighting effects 122 and/or light sources 116 within the scene 110. Conversely, the lighting effects 122 and/or light sources 116 of the scene 110 may be applied to the user interface outside of the scene 122 (e.g., a glossy lighting effect 122 applied to a surface may also be visually reflected upon other portions of the user interface adjacent to the scene 122). Lighting effects 122 and/or light sources 116 of one scene 110 may also be propagated to other scenes 110 integrated with the user interface, such as casting a light source 116 from a first scene 110 into a second scene 110, which may include generating new lighting effects 122 in the second scene 110. Blended combinations of such lighting effects 122 and light sources 116 may also be used; e.g., a scene 110 may incorporate lighting effects 122 of the first rendering 402, light sources 116 from the user interface, and light sources 116 from an adjacent scene 110 of the user interface. Such integration may also be performed proportionally (e.g., reflecting the visual distance and/or spatial layout between scenes 110 in the user interface), and/or may be weighted (e.g., a scene 110 may strongly reflect its own light sources 116 and lighting effects 122, and more subtly reflect the light sources 116 and/or lighting effects 122 shared by another scene 110 or the user interface). Many such techniques may be utilized in the integrated presentation of multiple scenes 110 in accordance with the techniques presented herein.

F. Computing Environment

Figure 12:
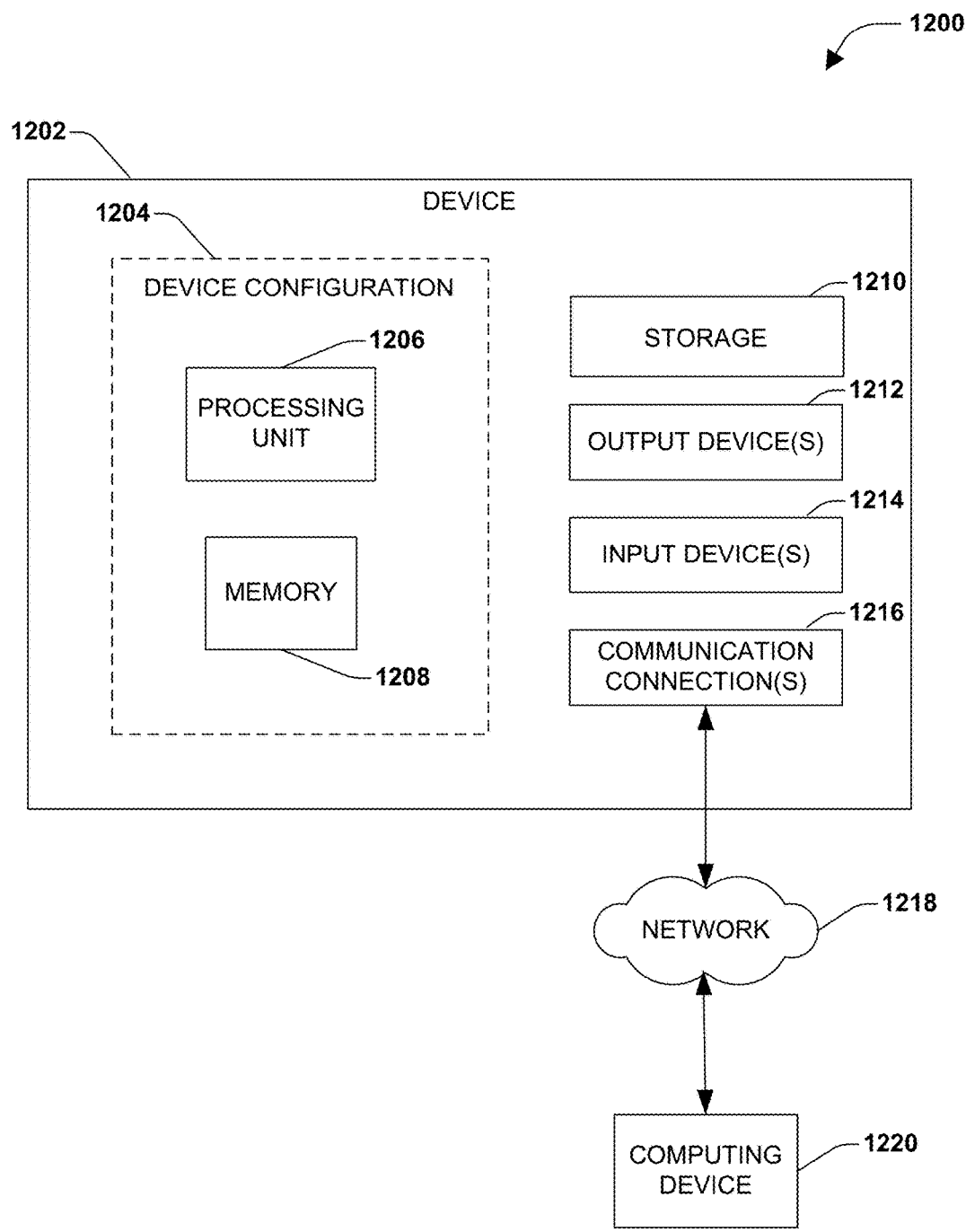
FIG. 12 is an illustration of an example computing environment wherein one or more of the provisions set forth herein may be implemented.

FIG. 12 and the following discussion provide a brief, general description of a suitable computing environment to implement embodiments of one or more of the provisions set forth herein. The operating environment of FIG. 12 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1200 comprising a computing device 1202 configured to implement one or more embodiments provided herein. In one configuration, computing device 1202 includes at least one processing unit 1206 and memory 1208. Depending on the exact configuration and type of computing device, memory 1208 may be volatile (such as RAM, for example), non-volatile (such as ROM, flash memory, etc., for example) or some combination of the two. This configuration is illustrated in FIG. 12 by dashed line 1204.

In other embodiments, device 1202 may include additional features and/or functionality. For example, device 1202 may also include additional storage (e.g., removable and/or non-removable) including, but not limited to, magnetic storage, optical storage, and the like. Such additional storage is illustrated in FIG. 12 by storage 1210. In one embodiment, computer readable instructions to implement one or more embodiments provided herein may be in storage 1210. Storage 1210 may also store other computer readable instructions to implement an operating system, an application program, and the like. Computer readable instructions may be loaded in memory 1208 for execution by processing unit 1206, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1208 and storage 1210 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1202 may also include communication connection(s) 1216 that allows device 1202 to communicate with other devices. Communication connection(s) 1216 may include, but is not limited to, a modem, a Network Interface Card (NIC), an integrated network interface, a radio frequency transmitter/receiver, an infrared port, a USB connection, or other interfaces for connecting computing device 1202 to other computing devices. Communication connection(s) 1216 may include a wired connection or a wireless connection. Communication connection(s) 1216 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1202 may include input device(s) 1214 such as keyboard, mouse, pen, voice input device, touch input device, infrared cameras, video input devices, and/or any other input device. Output device(s) 1212 such as one or more displays, speakers, printers, and/or any other output device may also be included in device 1202. Input device(s) 1214 and output device(s) 1212 may be connected to device 1202 via a wired connection, wireless connection, or any combination thereof. In one embodiment, an input device or an output device from another computing device may be used as input device(s) 1214 or output device(s) 1212 for computing device 1202.

Components of computing device 1202 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1202 may be interconnected by a network. For example, memory 1208 may be comprised of multiple physical memory units located in different physical locations interconnected by a network.

Those skilled in the art will realize that storage devices utilized to store computer readable instructions may be distributed across a network. For example, a computing device 1220 accessible via network 1218 may store computer readable instructions to implement one or more embodiments provided herein. Computing device 1202 may access computing device 1220 and download a part or all of the computer readable instructions for execution. Alternatively, computing device 1202 may download pieces of the computer readable instructions, as needed, or some instructions may be executed at computing device 1202 and some at computing device 1220.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting a scene of objects lit by a light source, the method using a processor of a device and comprising:
   executing, by the processor, instructions that cause the device to:
   generate a first three-dimensional rendering of the objects of the scene from a first selected viewing perspective, wherein the first selected viewing perspective is partitioned into a lighting perspective where the light source is rendered upon the objects to produce a lighting effect from the first selected viewing perspective including lighting effects caused by relative positions of the objects and the light source, and wherein the first selected viewing perspective is further partitioned into an object perspective from which the objects are rendered;
store the first three-dimensional rendering of the objects of the scene, including the lighting effect; and
responsive to a request to render the scene from a second selected perspective:
generate a second three-dimensional rendering of the objects of the scene from a second selected viewing perspective by re-rendering an object model of the object perspective while applying the stored lighting effect upon the objects from the first selected viewing perspective to maintain consistent lighting effects while shifting the viewing perspective of the object model from the first selected viewing perspective to the second selected viewing perspective; and
present the second three-dimensional rendering to fulfill the request.

2. The method of claim 1, wherein executing the instructions further causes the device to, responsive to receiving a lighting effect alteration of the lighting effect within the scene:
apply the lighting effect alteration to the lighting effect;
generate a third three-dimensional rendering of the objects of the scene that includes the stored lighting effect, altered by the lighting effect alteration; and
present the third three-dimensional rendering including the lighting effect alteration.

3. The method of claim 2, wherein:
the second three-dimensional rendering of the objects of the scene is presented within a visual context of the device; and
applying the lighting effect alteration further comprises: matching the lighting effect to the visual context of the device in which the scene is presented.

4. The method of claim 2, wherein:
the second three-dimensional rendering of the objects of the scene further comprises an animation of the scene, wherein respective animation frames of the animation include an animation frame lighting effect alteration; and
applying the lighting effect alteration further comprises: for a selected animation frame of the animation, applying the animation frame lighting effect alteration of the selected animation frame to the lighting effect.

5. The method of claim 2, wherein:
the lighting effect alteration further comprises a surface alteration of a surface of the lit object that incorporates the lighting effect; and
applying the lighting effect alteration further comprises: adapting the lighting effect to match the surface alteration of the surface of the lit object.

6. The method of claim 1, wherein executing the instructions further causes the device to:
present a toggle option that toggles between the second three-dimensional rendering that maintains the lighting effect from the first selected viewing perspective and a third three-dimensional rendering that re-renders the light source using the second three-dimensional perspective; and
responsive to a selection of the toggle option that selects the third three-dimensional rendering:
generate the third three-dimensional rendering of the objects of the scene from the second perspective, including rendering the light source upon the objects to produce the lighting effect from the second perspective; and
present the third three-dimensional rendering to fulfill the selection.

7. The method of claim 1, wherein generating the second three-dimensional rendering of the objects of the scene further comprises:
rendering the light source to produce a second lighting effect from the second perspective; and
blending the lighting effect and the second lighting effect upon the lit object to blend the first selected viewing perspective and the second perspective.

8. A method of representing a scene of objects using a processor of a device and a data store, the method comprising:
executing, by the processor, instructions that cause the device to:
receive a scene representation of the scene comprising:
a set of object models for the respective objects of the scene,
a light source positioned within the scene, and
a first selected viewing perspective for lighting the scene wherein the first selected viewing perspective is partitioned into a lighting perspective where the light source is rendered upon an object model of an object of the scene to produce a lighting effect from the first selected viewing perspective including lighting effects caused by relative positions of the objects and the light source, and wherein the first selected viewing perspective is further partitioned into an object perspective from which the objects are rendered; and
store, in the data store, a three-dimensional scene representation of the scene comprising:
the object models;
the lighting effect from the first selected viewing perspective; and
generate a second three-dimensional scene representation of the scene from a second selected viewing perspective by re-rendering the object model of the object perspective while applying the stored lighting effect upon the objects from the first selected viewing perspective to maintain consistent lighting effects while shifting the viewing perspective of the object model from the first selected viewing perspective to the second selected viewing perspective.

9. The method of claim 8, wherein:
the object model of the object further comprises a texture;
rendering the light source upon the object model further comprises: altering the texture of the object to produce a lit texture that incorporates the lighting effect from the first selected viewing perspective; and
storing the lighting effect further comprises: storing the lit texture of the object that incorporates the lighting effect from the first selected viewing perspective.

10. The method of claim 8, wherein:
rendering the light source further comprises: generating a lighting effect expression of a lighting calculation for rendering the lighting effect upon the object model of the object from the first selected viewing perspective; and
storing the lighting effect further comprises: storing the lighting effect expression of the lighting calculation for rendering the lighting effect upon the object model of the object from the first selected viewing perspective.

11. The method of claim 8, wherein:
rendering the light source upon the object model further comprises: generating a lighting effect result that is applicable to light the object model of the object from the first selected viewing perspective; and storing the lighting effect further comprises: storing the lighting effect result associated with the object.

12. The method of claim 8, wherein:

the light source is defined by a light source information set; and executing the instructions further causes the device to store, in the data store with the three-dimensional scene representation of the scene, the light source information set and the first selected viewing perspective.

13. The method of claim 8, wherein:

the object model of the object further comprises surface information describing a surface of the object model upon which the lighting effect of the light source is visible from the first selected viewing perspective; and executing the instructions further causes the device to store, in the data store with the three-dimensional scene representation of the scene, the surface information describing the surface of the object model.

14. A device comprising:

a data store storing a scene representation of a scene of objects comprising:
- a set of object models of the respective objects of the scene, and
- a lighting effect generated upon an object of the scene by a light source when rendered from a first selected viewing perspective, wherein the first selected viewing perspective is partitioned into a lighting perspective where the light source is rendered upon the objects to produce a lighting effect from the first selected viewing perspective including lighting effects caused by relative positions of the objects and the light source, and wherein the first selected viewing perspective is further partitioned into an object perspective from which the objects are rendered; and a processor configured to generate a three-dimensional rendering of the scene from a second selected viewing perspective by:
- rendering the object models of the respective objects from the second selected viewing perspective, and
- rendering the lighting effect upon the object maintained from the first selected viewing perspective; and
rendering the scene from the second selected viewing perspective, including the lighting effect upon the object from the first selected viewing perspective, wherein the lighting effect presented at the second selected viewing perspective is inconsistent with a second lighting effect of the light source that is generated upon the object of the scene by the light source when rendered from the second selected viewing perspective.

15. The device of claim 14, wherein:

the scene representation of the scene further comprises, for the object, a texture that incorporates the lighting effect of the light source upon the object from the first selected perspective; and rendering the lighting effect upon the object further comprises: applying the texture to the object to maintain the lighting effect from the first selected perspective while presenting the object model of the object from the second selected viewing perspective.

16. The device of claim 14, wherein:

the device stores a first three-dimensional rendering of a first scene and a second three-dimensional rendering of a second scene; and the processor integrates the first three-dimensional rendering of the first scene and the second three-dimensional rendering of the second scene to produce an integrated three-dimensional rendering.

17. The device of claim 16, wherein:

the processor, responsive to receiving an altered second perspective:
- re-renders the object models of the respective objects of the first scene from the altered second perspective;
- re-renders the lighting effect upon the object maintained from the first selected viewing perspective; and
- integrates the re-rendering of the first scene and the second three-dimensional rendering of the second scene to produce a second integrated three-dimensional rendering; and
renders the second integrated three-dimensional rendering including the altered second perspective of the first scene while maintaining the second perspective of the second scene.

18. The device of claim 16, wherein:

the processor, responsive to receiving an altered second perspective:
- re-renders both the first scene and the second scene using the altered second perspective, and
- integrates the re-rendering of the first scene and the second scene to produce a second integrated three-dimensional rendering; and
renders the second integrated three-dimensional rendering applying the altered second perspective to both the first scene and the second scene.

19. The device of claim 16, wherein:

the processor, responsive to receiving a lighting effect alteration:
- applies the lighting effect alteration to the lighting effect;
- re-renders the lighting effect, altered according to the lighting effect alteration, upon the object of the first scene; and
- integrates the re-rendering of the first scene and the second three-dimensional rendering of the second scene to produce a second integrated three-dimensional rendering; and
renders the second integrated three-dimensional rendering including the lighting effect alteration applied to the first scene while maintaining the lighting effect of the second scene.

20. The device of claim 16, wherein:

the processor, responsive to receiving a lighting effect alteration:
- applies the lighting effect alteration to the lighting effect;
- re-renders the lighting effect, altered according to the lighting effect alteration, upon objects of the first scene and the second scene; and
- integrates the re-rendering of the first scene and the second scene to produce a second integrated three-dimensional rendering; and
- renders the second integrated three-dimensional rendering including the lighting effect alteration applied to both the first scene and the second scene.

* * * * *